Jan. 24, 1961 J. EGGMANN 2,969,247
UNIVERSALLY MOVABLE PIPE JOINT
Filed Feb. 7, 1958 2 Sheets-Sheet 1

INVENTOR
Jean Eggmann
BY Pierce, Schiffler & Parker
ATTORNEYS

Jan. 24, 1961    J. EGGMANN    2,969,247
UNIVERSALLY MOVABLE PIPE JOINT
Filed Feb. 7, 1958    2 Sheets-Sheet 2

INVENTOR
Jean Eggmann
BY Pierce, Scheffler & Parker
ATTORNEYS

United States Patent Office 2,969,247
Patented Jan. 24, 1961

2,969,247
UNIVERSALLY MOVABLE PIPE JOINT

Jean Eggmann, Ennetbaden, Switzerland, assignor to Aktiengesellschaft Brown, Boveri & Cie, Baden, Switzerland a joint-stock company of Switzerland Filed Feb. 7, 1958, Ser. No. 713,900

Claims priority, application Switzerland Feb. 28, 1957

4 Claims. (Cl. 285—114)

This invention relates to pipe joints and more particularly to joints of the flexible type such as expansion folds for rigid pipes used in steam and gas turbine systems, compressor systems, etc., which permit axial expansion in both directions as well as lateral deflection of the pipes at the joints.

In order to prevent or minimize the effect of such longitudinal forces on the pipe as would cause it to be pulled apart at the joint, it has been the practice to provide longitudinal stress absorbing members which are anchored at their opposite ends to the pipe at opposite sides of the joint respectively, thus bridging the joint. When such bridging members are arranged in the center axis of the pipe, the joint is enabled to flex at all sides. However, when the bridging members are arranged externally of the pipe, usually two, in accordance with all previously known constructions, flexing of the joint can take place in only one direction and such direction is determined by the location of the bridging members.

When the pipe involved is subject to expansion by changes in temperature and a joint is inserted in the pipe to absorb the expansion it is advantageous if the joint is so arranged as to permit flexing of the joint in all directions. This may be accomplished with known types of expansion joint structure wherein the interconnecting, longitudinal stress absorbing members of the joint are, as stated above, in the center axis of the pipe. However, it is not practical in all cases to use such an internal arrangement and hence it is a primary object of the present invention to provide an improved external arrangement for the longitudinal stress absorbing members and which permits flexing of the joint in all directions about the joint axis and yet maintains a uniform tension in the longitudinal stress absorbing members regardless of the direction in which the joint is flexed. More particularly, the improved joint is characterized by at least three knee joints which at their ends are movably connected to both sides of a junction of the pipe at the outside thereof at equal distances and are supported in the knee by a ring freely surrounding the pipe.

The invention may be carried out according to different embodiments and three such embodiments are illustrated in the accompanying drawings, each of which shows the joint and related pipe ends partly in longitudinal section and partly in elevation.

Figure 3:
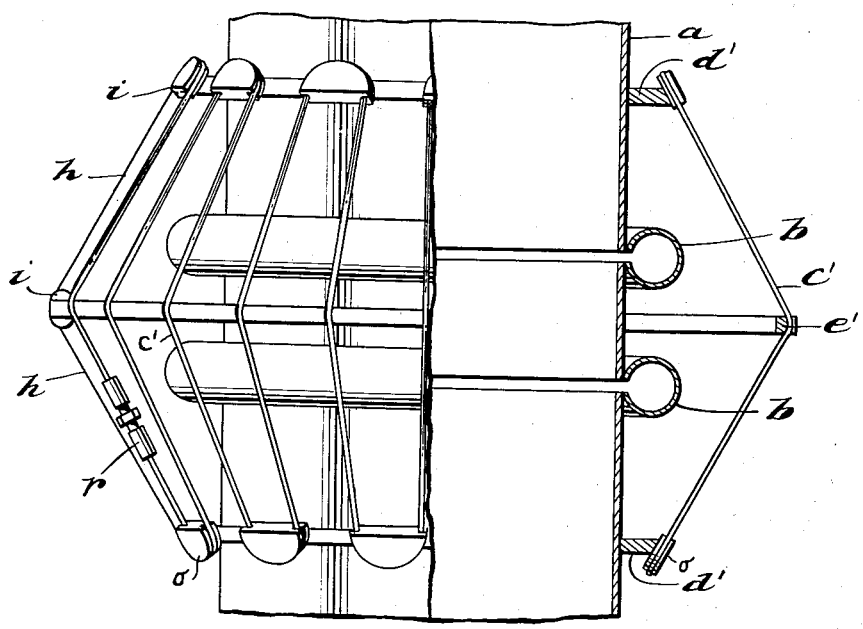
Figure 4:
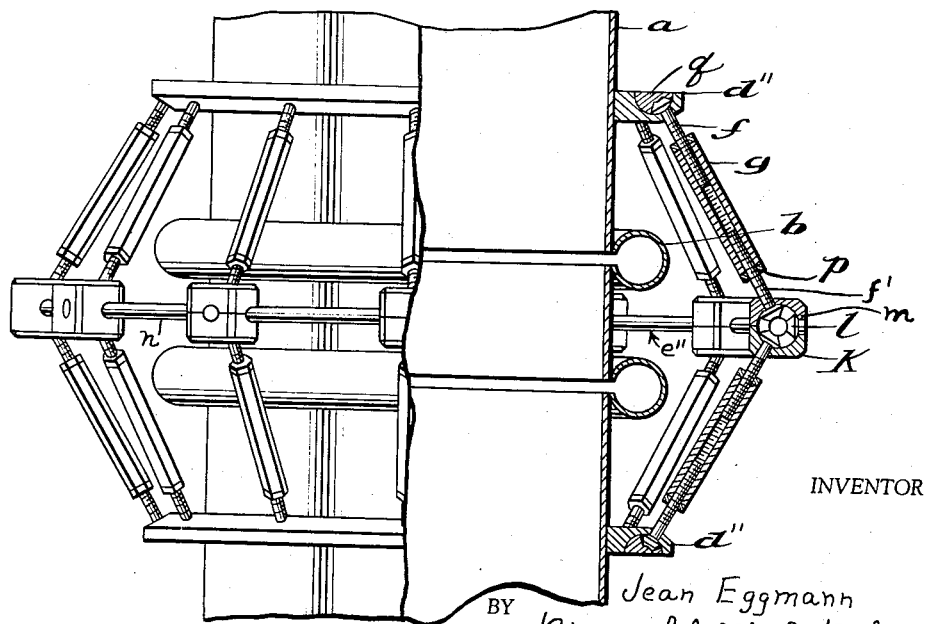

Fig. 3 shows an embodiment of the invention wherein the longitudinal connecting members are also constituted by wire rope arranged in knee joints but wherein the rope is continuous from end to end; and Fig. 4 shows a third embodiment wherein the longitudinal connecting members are constituted by rods arranged in knee joints, each rod containing a turnbuckle type of longitudinal take-up between the end of the rod anchored to the pipe and the other end of the rod which terminates in the knee joint.

Figure 1:
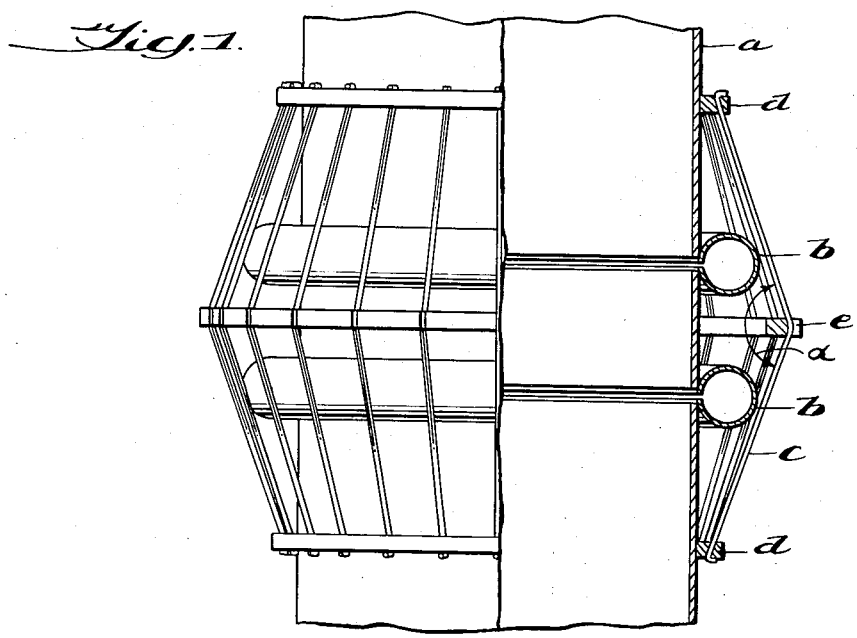
Fig. 1 shows one embodiment of the invention wherein the longitudinal connecting members are constituted by individual elastic wire ropes arranged as knee joints in equally spaced relation around the outside of the pipe.
Figure 2:
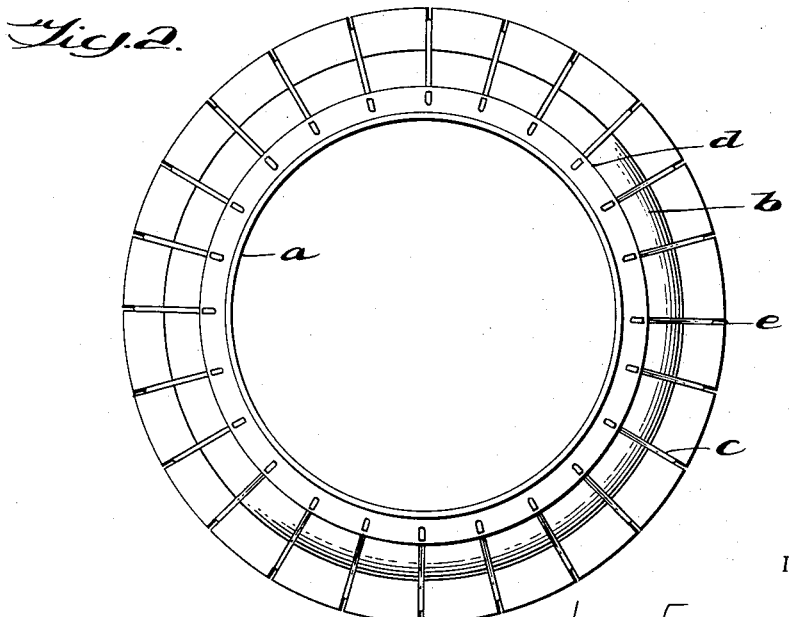
Fig. 2 is a plan view of the pipe joint shown in Fig. 1.

With reference now to the drawings, and Fig. 1 in particular, the confronting ends of the pipes to be joined are indicated at $a$ and the joint includes at $b$ a double expansion fold. The latter is merely typical and may be replaced with any equivalent type of flexible pipe union. Each pipe end has secured to it a peripheral flange $d$ and extending between the flanges $d$ are a plurality of individual wires $c$. The wire members $c$ are spaced circumferentially equally about the longitudinal axis of the pipe, their ends are secured to the flanges $d$, and the intermediate portions of the wire members $c$ are received in equally circumferentially spaced slots in a ring $e$ which is of larger diameter than the flanges $d$. Ring $e$ is positioned at the center of the joint, i.e. midway between the expansion folds $b$ and is supported solely by the wire members $c$ in a free floating manner in radially spaced relation from the pipe $a$. Each of the wire members $c$ and its connection with the ring $e$ thus forms a knee joint which is opened or closed depending upon the nature of the expansion forces exerted on the pipe. When the pipe joint is compressed on one side and expanded on the opposite side, the distances between the ends of the wire members $c$ will be shortened on the compressed side of the pipe joint while on the opposite side, such distances will be lengthened in about the same proportion. The included angles $\alpha$ between the lengths of the wires $c$ on opposite sides of ring $e$ become smaller on the compressed side and larger on the opposite side, and the supporting ring $e$ is moved outward away from the longitudinal axis of the pipe on the compressed side and toward such axis on the expanded side. Consequently the tension in each of the wire members $c$ remains the same notwithstanding any flexing movement in the pipe joint. As the wires $c$ are freely movable in an angular manner about their anchor points in the flanges $d$ and the construction of the pipe joint is rotation-symmetrical in relation to the longitudinal axis of the pipe, no bending direction is fixed and hence the pipe joint can be said to be universally movable.

The supporting ring $e$ can either be made in the form of a circular ring or can be made in the form of an articulated polygon. If made in the form of a circular ring it should be as elastic as possible so that it can absorb by deformation any deviations of the geometric sites of all knee joint supporting points from the circle when the pipe is bent. If it is possible that axial forces may arise which will place the pipe joint under compressive stresses, special measures should be taken and these are explained with respect to the embodiments illustrated in Figs. 3 and 4.

In Fig. 3, the pipe is again shown at $a$ and the double expansion fold is again indicated at $b$. However, instead of individual wires forming with the ring the several knee joints spaced around the axis of the pipe as in Fig. 1, the knee joints are formed by means of one length of wire rope $c'$ which is laced back and forth over pulley shaped anchoring surfaces $o$ established on the pipe flanges $d'$ and over the ring $e'$. The opposite ends of the wire rope $c'$ are connected and tightened by means of a turnbuckle $r$. In order that any compressive forces may be absorbed, at some of the knee joints, tubes $h$ are drawn over the sections of the wire rope $c'$ and these are supported on spherical surfaces $i$ on the flanges $d'$ and on the ring $e'$ and thus absorb oppositely directed compressive forces at the pipe $a$. At the same time, the tubes $h$ serve for spacing of the parts connected in the pipe joint when adjusting the same by means of the turnbuckle.

A further embodiment of the invention is illustrated in Fig. 4. In this embodiment the pipe is again shown at $a$ and the double expansion fold again illustrated at $b$. Each leg of a knee joint is seen to be comprised of a pair of threaded bolts $f$, $f'$ with spherical heads, a tubular tightening nut $g$ between the bolts $f$, $f'$ and lock nuts $p$ on the bolts which secure the bolts and their tightening nuts in the desired positions of adjustment. The remote ends of the bolts $f$ are anchored in the flanges $d''$ on the pipes $a$ by means of filling pieces $q$. The ring $e''$ is designed as an articulated polygon comprised of individual bars $n$. Pairs of the bolts $f'$ with spherical heads and pairs of the bars $n$ are interconnected by a two-part hollow sphere $k$ to form each knee joint, and by means of a smaller sphere $l$ it is also provided that pressure forces can be absorbed. To be able to center the sphere $l$, a filling piece $m$ is also required.

The pipe joints which have been described permit, within the flexibility of the pipe union a bending in any direction. The necessary connecting members for the absorption of the axial forces are disposed outside the pipe which is of particular advantage at high temperatures of the medium which flows through the pipe. Also, the external connecting members cause no additional resistance to flow for the fluid medium. Most parts of the pipe joint are under pure tensile or compressive stress, so that the entire expenditure for material is low and the entire joint is light, for which reason it is well suited for light-weight construction. Moreover, the joint can be manufactured with simple structural parts at no great cost.

I claim:

1. In a universally movable joint for rigid pipe the combination comprising a pair of rigid pipe ends arranged in confronting relation, a flexible pipe union interconnecting said pipe ends, an external flange secured on each of said pipe ends, said flanges being located on opposite sides of said pipe union, at least three longitudinally extending tension members arranged in equally spaced relation around the outside of said interconnected pipe ends and anchored at opposite ends thereof to the respective flanges, and a ring surrounding said interconnected pipe ends in a free floating manner in radially spaced relation from said pipe ends, the mid-portions of said longitudinally extending tension members being connected to said ring at points thereon lying at a greater radius from the pipe axis than are the end anchoring points on said flanges whereby a knee joint is established on each of said tension members at its point of connection to said ring, said ring being movable from a position concentric with the pipe axis and normal thereto when both pipe ends are axially aligned to an eccentric position and tilted from a normal to said pipe axis depending upon the direction in which one of said pipe ends is bent relative to the other at said flexible union, and which is accompanied simultaneously by a flexing of said knee joints to maintain equal tension in all of said tension members.

2. A universally movable pipe joint as defined in claim 1 wherein each such knee-jointed tension member is constituted by a length of flexible wire, the opposite ends of each said wire being anchored to said flanges on the pipe ends and the mid-portion of each said wire being secured to said ring.

3. A universally movable pipe joint as defined in claim 1 wherein said knee-jointed tension members are constituted by a single length of wire rope wound back and forth on points of attachment provided on said flanges on the pipe ends, the mid-points of the wire rope between said flanges on the pipe ends being secured to said ring.

4. A universally movable pipe joint as defined in claim 1 wherein said knee-jointed tension members are constituted by length-adjustable rods extending between said flanges on the pipe ends and said ring, said ring being constituted by a plurality of bars interconnected at their ends by coupling members to establish a polygon, and said rods being conencted to said ring at said coupling members.

References Cited in the file of this patent

UNITED STATES PATENTS

| | | |
|---|---|---|
| 993,934 | Witzenmann | May 30, 1911 |
| 1,076,738 | Berry | Oct. 28, 1913 |
| 2,579,619 | Scott | Dec. 25, 1951 |
| 2,616,255 | Altorfer | Nov. 4, 1952 |
| 2,699,959 | Zallea | Jan. 18, 1955 |
| 2,707,117 | Fentress | Apr. 26, 1955 |
| 2,886,066 | Hansen | May 12, 1957 |
| 2,898,940 | Cole | Aug. 11, 1959 |

FOREIGN PATENTS

| | | |
|---|---|---|
| 544,805 | Great Britain | Apr. 28, 1942 |
| 262,367 | Switzerland | Oct. 1, 1949 |
| 835,379 | Germany | Mar. 31, 1952 |
| 695,015 | Great Britain | Aug. 5, 1953 |